United States Patent
Kim et al.

(10) Patent No.: US 10,228,723 B2
(45) Date of Patent: Mar. 12, 2019

(54) ELECTRONIC DEVICE AND CONTROLLING METHOD THEREOF

(71) Applicant: Samsung Electronics Co., Ltd., Gyeonggi-do (KR)

(72) Inventors: Nam Hoi Kim, Suwon-si (KR); Byung Jin Kang, Seoul (KR); Seong Woong Park, Seoul (KR); Do Hyung Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 15/173,543

(22) Filed: Jun. 3, 2016

(65) Prior Publication Data

US 2016/0357298 A1 Dec. 8, 2016

(30) Foreign Application Priority Data

Jun. 4, 2015 (KR) .................. 10-2015-0079398

(51) Int. Cl.
 *G06F 3/041* (2006.01)
 *G06F 1/16* (2006.01)
 *G06F 3/0488* (2013.01)

(52) U.S. Cl.
 CPC .......... *G06F 1/1626* (2013.01); *G06F 1/1643* (2013.01); *G06F 1/1684* (2013.01); *G06F 3/04883* (2013.01); *G06F 2203/04105* (2013.01)

(58) Field of Classification Search
 USPC .................. 345/156, 173, 174; 361/679.12; 341/176; 715/841, 738
 See application file for complete search history.

(56) References Cited

U.S. PATENT DOCUMENTS

| | | | | |
|---|---|---|---|---|
| 2010/0060504 A1* | 3/2010 | Kim | .................. | H04N 5/44582 341/176 |
| 2013/0201155 A1* | 8/2013 | Wu | .................. | G06F 3/03547 345/174 |
| 2014/0101560 A1* | 4/2014 | Kwak | .................. | G06F 1/1652 715/738 |
| 2014/0197380 A1* | 7/2014 | Sung | .................. | H01L 27/3241 257/40 |
| 2014/0232668 A1* | 8/2014 | Kim | .................. | G06F 3/041 345/173 |
| 2014/0340299 A1* | 11/2014 | Lee | .................. | G06F 1/1652 345/156 |
| 2014/0375574 A1* | 12/2014 | Kim | .................. | G06F 3/147 345/173 |
| 2015/0055284 A1* | 2/2015 | Han | .................. | G06F 1/1616 361/679.12 |

(Continued)

FOREIGN PATENT DOCUMENTS

KR 2013-0129914 11/2013

*Primary Examiner* — Thuy Pardo

(57) ABSTRACT

An electronic device and method of controlling the electronic device is provided. The electronic device includes a display that includes a flat region and at least one curved region, an input device that receives a user manipulation, at least one pressure sensor that senses a pressure applied to the electronic device. The electronic device also includes a processor that performs an operation corresponding to the user manipulation based on the result of the sensed pressure caused by the user manipulation inputted on the curved region.

16 Claims, 12 Drawing Sheets

(56) References Cited

U.S. PATENT DOCUMENTS

| | | | | |
|---|---|---|---|---|
| 2015/0205501 A1* | 7/2015 | Fujii | ............... | G06F 3/0484 |
| | | | | 715/763 |
| 2015/0220195 A1* | 8/2015 | Jin | ............... | G06F 1/1643 |
| | | | | 345/173 |
| 2016/0026219 A1* | 1/2016 | Kim | ............... | H04M 1/0245 |
| | | | | 345/173 |
| 2016/0041716 A1* | 2/2016 | Richardson | ............... | G06F 3/0488 |
| | | | | 345/173 |
| 2016/0188197 A1* | 6/2016 | Ryu | ............... | G06F 3/04883 |
| | | | | 345/156 |
| 2016/0195938 A1* | 7/2016 | Kim | ............... | H04B 1/3827 |
| | | | | 345/156 |
| 2016/0202869 A1* | 7/2016 | Kim | ............... | G06F 3/0488 |
| | | | | 715/841 |
| 2016/0320966 A1* | 11/2016 | Ryu | ............... | G06F 3/04883 |
| | | | | 345/173 |

* cited by examiner

ELECTRONIC DEVICE AND CONTROLLING METHOD THEREOF

CROSS-REFERENCE TO RELATED APPLICATION(S) AND CLAIM OF PRIORITY

The present application is related to and claims the benefit under 35 U.S.C. § 119(a) of a Korean patent application filed on Jun. 4, 2015 in the Korean Intellectual Property Office and assigned Serial number 10-2015-0079398, the entire disclosure of which is hereby incorporated by reference.

TECHNICAL FIELD

The present disclosure relates to an electronic device that has a touch display and a method for controlling the electronic device.

BACKGROUND

With the development of electronic technologies, various types of electronic devices are being developed and supplied. In particular, portable electronic devices, which have a variety of functions, such as a smart phone, a tablet personal computer (PC), and the like are being used.

The electronic devices may be equipped with a display that may be an active matrix organic light emitting diode (AMOLED) display, a flexible display, a transparent display, a display with a curved region, and the like.

When the portable electronic device includes a display with the curved region on a side of the portable electronic device, a user may inadvertently cause an unintentional operation by touching the curved region when the user grips the portable electronic device. This makes it inconvenient for the user to use the portable electronic device.

Furthermore, locations of various buttons (e.g., a power button, a volume control button, and the like) that are located on a side surface of the portable electronic device are changed or removed. In this case, the user experiences a usage environment that may be different from previous portable electronic devices, thereby inconveniencing the user due to the change of locations of hardware buttons.

SUMMARY

To address the above-discussed deficiencies, it is an object to provide at least the advantages described below. Accordingly, an aspect of the present disclosure is to provide a user-friendly usage environment that makes it possible to prevent a malfunction due to the unintentional touch manipulation of a user and to replace hardware buttons that are removed or of which the locations are changed.

In accordance with an aspect of the present disclosure, an electronic device may include a display that includes a flat region and at least one curved region, an input module that receives a user manipulation, at least one pressure sensor that senses a pressure applied to the electronic device, and a processor that performs an operation corresponding to the user manipulation based on the result of the sensing the pressure caused by the user manipulation inputted on the curved region.

A method for controlling the electronic device according to various embodiments of the present disclosure may include receiving a user manipulation on a curved region of a display that includes a flat region and the at least one curved region, sensing a pressure applied to the electronic device by the user manipulation inputted on the curved region, and performing an operation corresponding to the user manipulation based on the sensed pressure.

According to various embodiments of the present disclosure, a computer-readable recording medium recorded a program, the program, when executed, causes an electronic device to perform a method may include receiving a user manipulation on a curved region of a display that includes a flat region and the at least one curved region, sensing a pressure applied to the electronic device by the user manipulation inputted on the curved region, and performing an operation corresponding to the user manipulation based on the sensed pressure.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
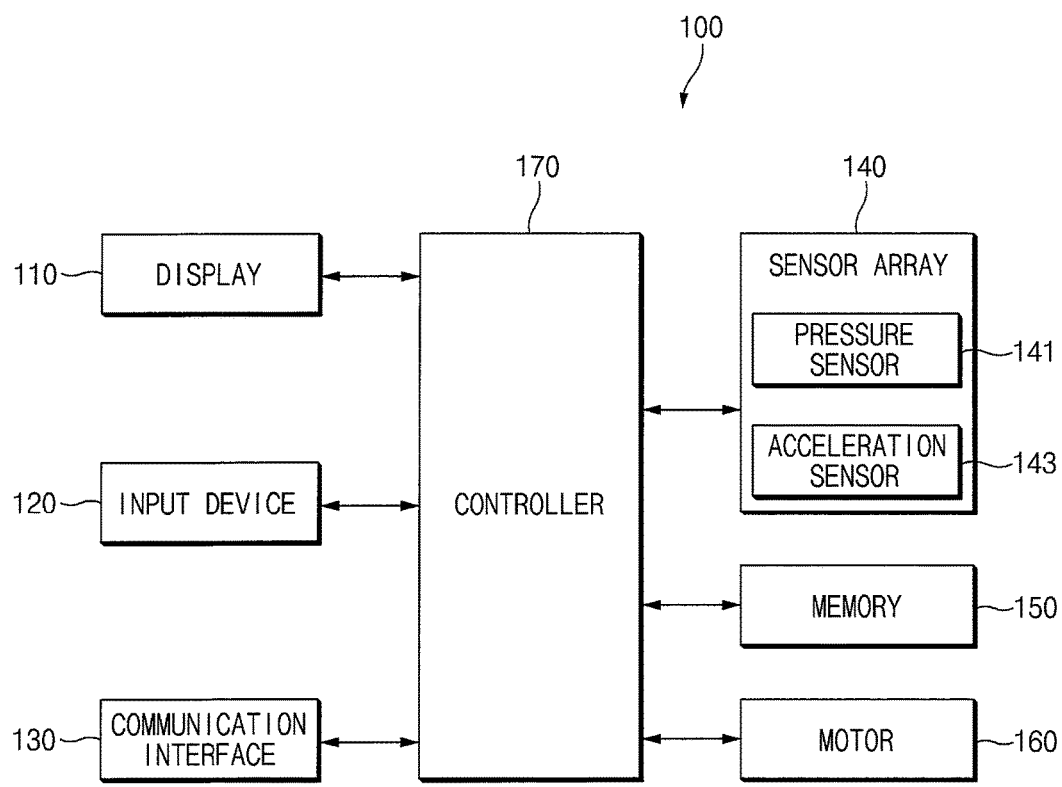
FIG. 1 is a block diagram illustrating a configuration of an electronic device according to various embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments of the present disclosure, a wearable device may include at least one of an accessory type (e.g., watch, ring, bracelet, ankle bracelet, necklace, glasses, contact lens, or head-mounted-device (HMD)), a fabric or clothing type (e.g., electronic apparel), a physical attachment type (e.g., skin pad or tattoo), or a body implantation type (e.g., implantable circuit).

According to an embodiment, the electronic device may be a home appliance. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like).

According to various embodiments, the electronic device may be one of the above-described devices or a combination thereof. An electronic device according to an embodiment may be a flexible electronic device. Furthermore, an electronic device according to an embodiment may not be limited to the above-described electronic devices and may include other electronic devices and new electronic devices according to the development of technologies.

Hereinafter, electronic devices according to an embodiment of the present disclosure will be described with reference to the accompanying drawings. The term "user" used herein may refer to a person who uses an electronic device or may refer to a device (e.g., an artificial intelligence electronic device) that uses an electronic device.

FIG. 1 is a block diagram illustrating a configuration of an electronic device according to various embodiments of the present disclosure.

Referring to FIG. 1, the electronic device 100 may include a display 110, an input device 120, a communication interface 130, a sensor array 140, and a controller 170.

The display 110 may display content. The content, for example, may include a picture, a video, an application execution screen, a user interface, an icon, a notification message, and the like.

Figure 2A:
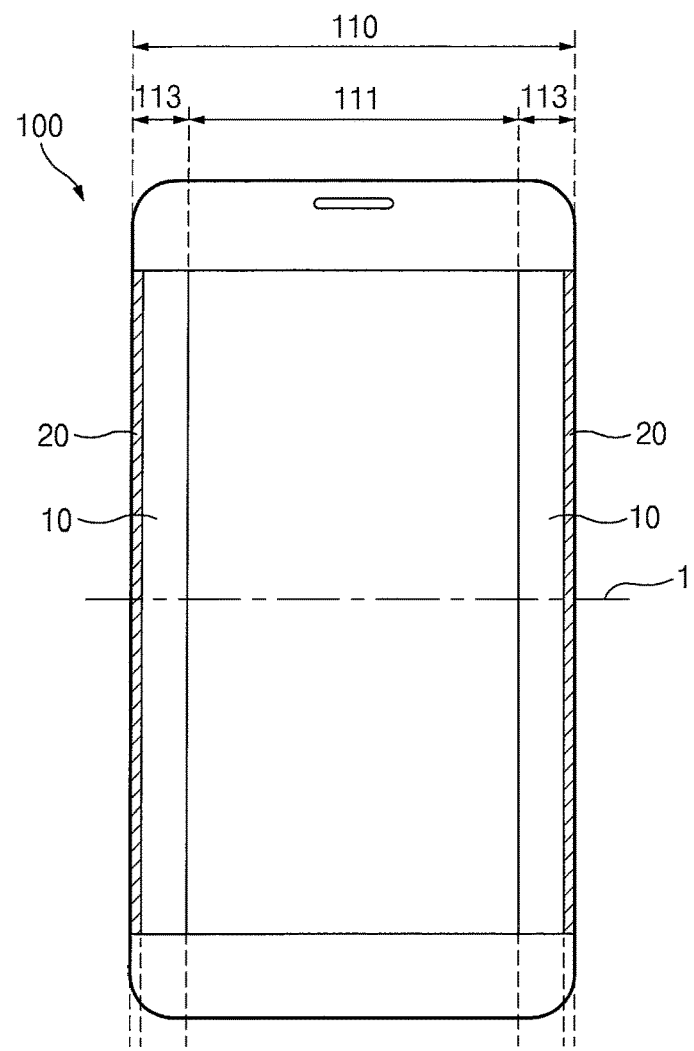
FIGS. 2A and 2B are diagrams illustrating a structure of the display according to various embodiments of the present disclosure.
Figure 2B:
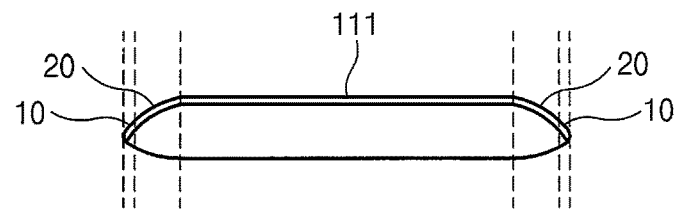

FIGS. 2A and 2B are diagrams illustrating a structure of the display according to various embodiments of the present disclosure.

FIG. 2A shows a front view of the electronic device 100, and FIG. 2B shows a section of the electronic device 100 taken along line 1 in a horizontal direction. Referring to FIGS. 2A and 2B, the display 110 may include a flat region (or a main display region) 111 and a curved region (or a sub-display region) 113. According to an embodiment, the display 110 may include at least one (e.g., two) curved region. For example, referring to FIGS. 2A and 2B, the display 110 may include the curved regions 113, which are connected with the flat region 111, on the left and right sides of the flat region 111.

According to an embodiment, each of the curved regions 113 may include a content region 10 on which content is displayed and a dummy region 20 on which a dummy image or content is displayed. The content region 10 may be connected with the flat region 111 and may display the content. For example, the content (e.g., a picture, a video, or an application execution screen) may be displayed over the flat region 111 and the content region 10.

According to an embodiment, the dummy image may be displayed on the dummy region 20. The dummy image may be displayed by copying an image displayed in the content region 10 to the dummy region 20. For example, the image displayed on pixels in the content region 10 that are the closest to the dummy region 20 (i.e., pixels in the content region 10 that form a boundary with the dummy region 20), may be copied to and displayed on the dummy region 20.

That is, the image displayed on the last pixels at the left and right sides of the content region 10 may extend to the dummy region 20 so as to be displayed thereon. According to an embodiment, the dummy image to which an image effect is applied may be displayed on the dummy region 20. For example, the image effect, such as a blur, a highlight, or the like, may be applied to the image displayed on the dummy region 20. According to an embodiment, a user may set an image displayed on the dummy region 20 and a kind of the image effect. For example, the user may set the dummy region 20 to an empty region such that any image is not displayed on the dummy region 20. Alternatively, as described above, the user may set the dummy region 20 such that the image displayed on the content region 10 extends to and is displayed on the dummy region 20. Alternatively, the user may set the dummy region 20 such that the image effect, such as the blur, the highlight, or the like, is applied to the image displayed on the dummy region 20.

According to an embodiment, the content may be displayed on the dummy region 20. For example, the content (e.g., a notification message or an application icon) may be displayed according to a user manipulation in a state where the dummy image is displayed on the dummy region 20.

The input device 120 may receive the user manipulation. According to an embodiment, the input device 120 may include a touch sensor panel that senses a user touch manipulation or a pen sensor panel that senses a user pen manipulation. According to an embodiment, the input device 120 may not only sense the user manipulation inputted through a direct contact with the panel (e.g., the touch sensor panel or the pen sensor panel), but it may also sense the user manipulation inputted within a specific distance without a direct contact with the panel.

According to an embodiment, the input device 120 and the display 110, for example, may be implemented with a touch screen that is capable of displaying and sensing the touch manipulation at the same time. In the touch screen, the touch sensor panel may be disposed on the display panel.

The communication interface 130 may send and receive data through a network (e.g., a mobile communication network or an internet network). According to an embodiment, the communication interface 130 may include a cellular interface, a wireless fidelity (Wi-Fi) interface, a Bluetooth interface, a near field communication (NFC) interface, a global navigation satellite system (GNSS) interface, and the like. According to an embodiment, the GNSS interface may determine a current position (e.g., latitude/longitude) of the electronic device 100 by utilizing information received from a satellite.

According to an embodiment, the communication interface 130 may send an emergency message to an external device that has a specific contact. According to an embodiment, the communication module 130 may send current position information to the external device that has the specific contact.

The sensor array 140 may sense a state of the electronic device 100. According to an embodiment, the sensor array 140 may include a pressure sensor 141 and an acceleration sensor 143.

According to an embodiment, the pressure sensor 141 may sense a pressure (or force) applied to the electronic device 100. The pressure sensor 141 may include a force sensing resistor (FSR) sensor. The FSR sensor may include a FSR element of which the resistance decreases as the pressure (or force) applied to a surface thereof increases. The FSR sensor may sense the pressure applied to the electronic device 100 based on the resistance change of the FSR element. According to an embodiment, the sensor array 140 may include at least one or more (e.g., plural) pressure sensors 141.

Figure 3A:
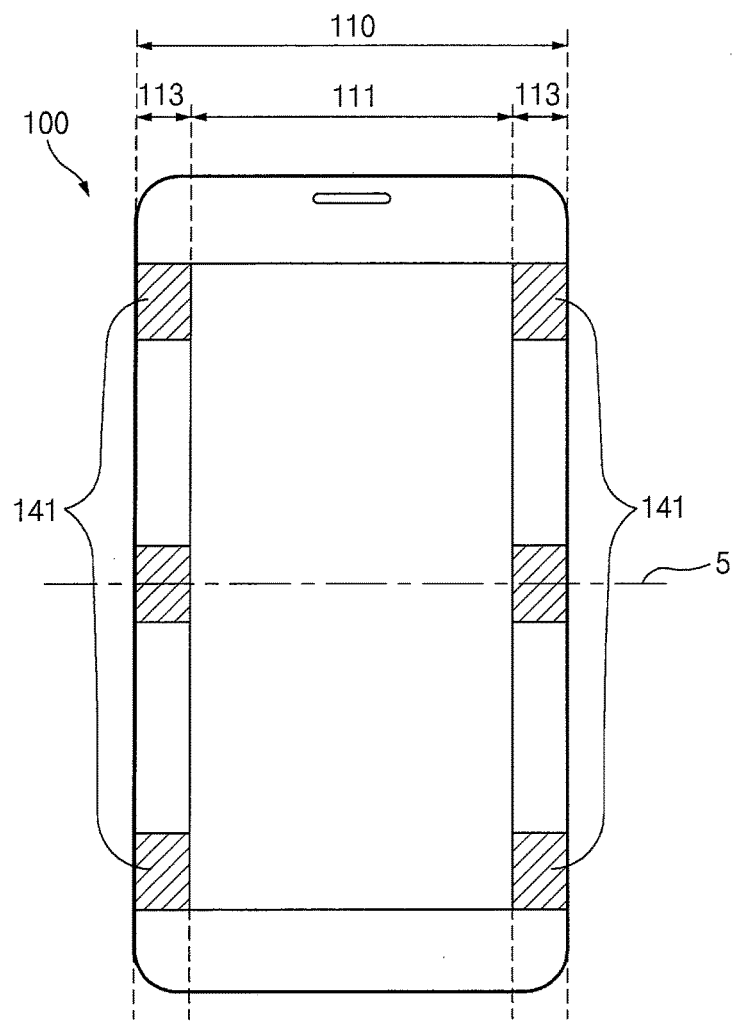
FIGS. 3A and 3B are diagrams illustrating a location of the pressure sensor according to various embodiments of the present disclosure.
Figure 3B:
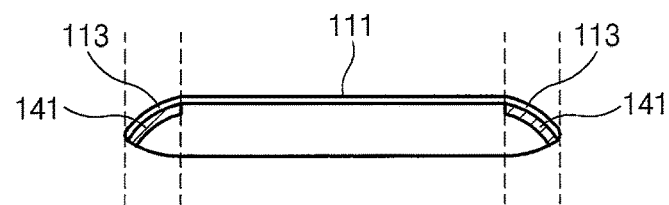

FIGS. 3A and 3B are diagrams illustrating a location of the pressure sensor 141 according to various embodiments of the present disclosure. FIG. 3A shows a front view of the electronic device 100, and FIG. 3B shows a section of the electronic device 100 taken along line 5 in a horizontal direction.

Referring to FIGS. 3A and 3B, the display 110 may include the flat region (or the main display region) 111 and the curved region (or the sub-display region) 113. The display 110 may include at least one (e.g., two) curved region. For example, the display 110 may include the curved regions 113, which are connected with the flat region 111, on the left and right sides of the flat region 111.

According to an embodiment, the pressure sensor 141 may be disposed under at least a partial region of the curved region 113. For example, referring to FIGS. 3A and 3B, a plurality of pressure sensors 141 may be disposed under the curved region 113 so as to be spaced apart therefrom by a specific distance. The plurality of pressure sensors 141 may sense and output a pressure applied to the electronic device 100 at the specific locations thereof.

According to an embodiment, the acceleration sensor 143 may sense movement of the electronic device 100. For example, the acceleration sensor 143 may sense the acceleration of the electronic device 100 and output the acceleration values of the electronic device 100 in three-axis (e.g., x, y, and z axes) directions.

According to an embodiment, a contact to which an emergency message is to be sent in an emergency may be stored in the memory 150 The user may set the contact to which the emergency message is to be sent.

The motor 160 may convert an electrical signal into a mechanical vibration. According to an embodiment, the motor 160 may generate the following effects: vibration, haptic effect, or the like. For example, the motor 160 may generate the vibration when a notification event (e.g., a message reception or the like) occurs.

The controller 170 may control an overall operation of the electronic device 100. For example, the controller 170 may control the display 110, the input device 120, the communication interface 130, the sensor array 140, the memory 150, and the motor 160, respectively, such that an operation of the electronic device 100 according to various embodiments of the present disclosure is performed.

According to an embodiment, the controller 170 may be a system on chip (SoC) (e.g., an application processor) that includes a processor (or central processing unit (CPU)), a graphic processing unit (GPU), a sensor hub, a video processor, and the like.

According to an embodiment, the controller 170 may disregard a user manipulation inputted on the dummy region 20 with a dummy image displayed on the dummy region 20. When the dummy image is displayed on the dummy region 20 instead of content, there may be no need to input the user manipulation in the dummy region 20, and thus the controller 170 may disregard the user manipulation inputted on the dummy region 20.

According to an embodiment, if the user manipulation is inputted on the curved region 113 of the display 110, the controller 170 may perform an operation corresponding to the user manipulation based on a result of sensing the pressure caused by the user manipulation. The user manipulation inputted on the curved region 113 of the display 110 may include, for example, a user manipulation inputted on the flat region 111 and the curve region 113 at the same time as well as the user manipulation inputted only on the curved region 113.

Figure 4A:
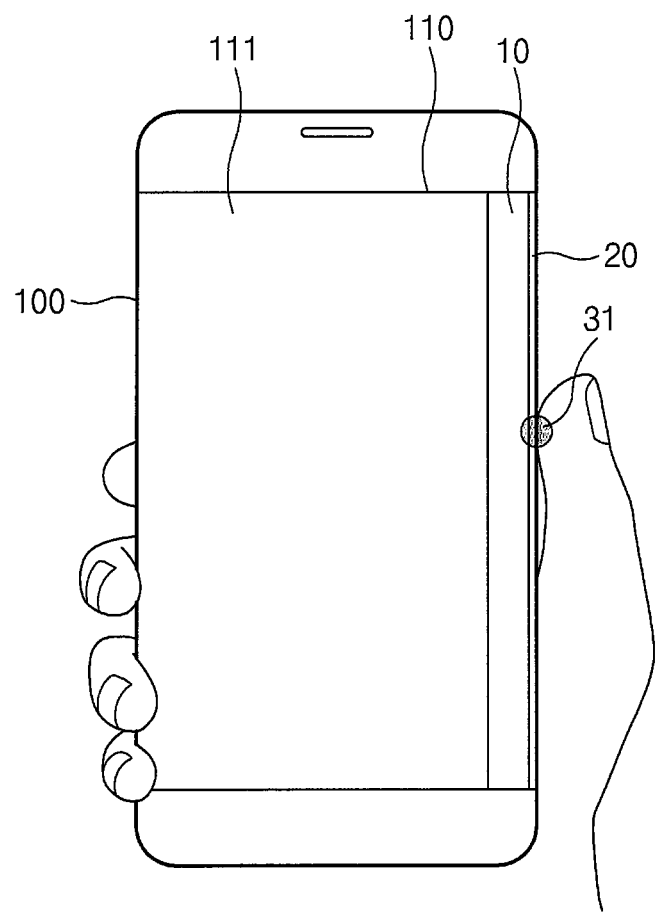
FIGS. 4A to 4C are diagrams illustrating an operation for displaying content on the curved region of the display, according to various embodiments of the present disclosure.
Figure 4B:
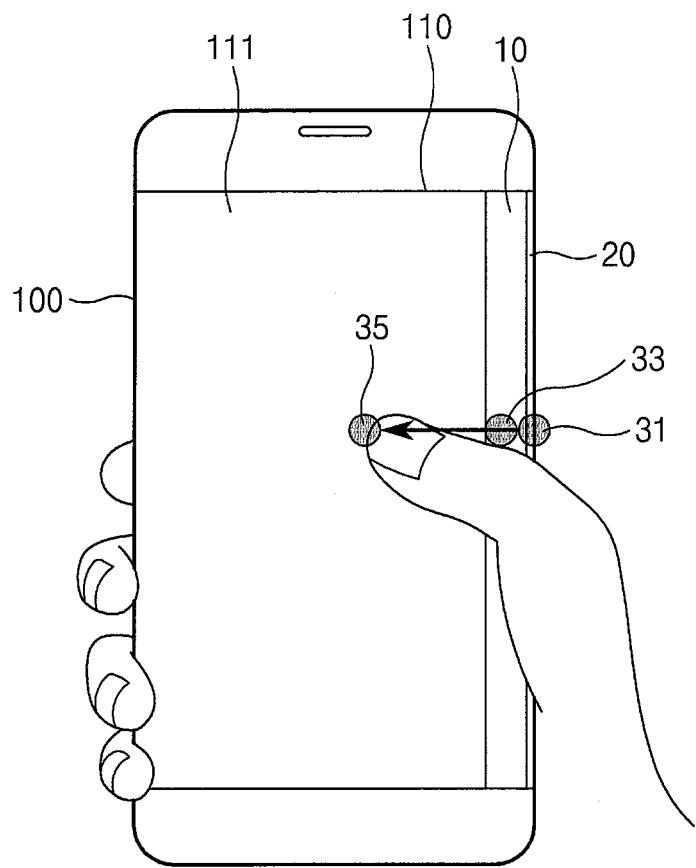
Figure 4C:
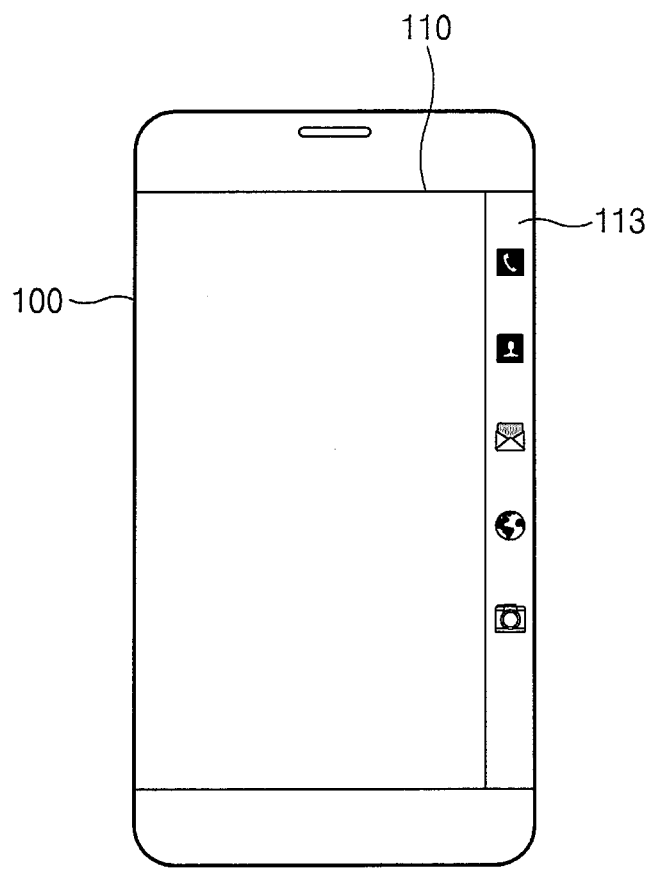

FIGS. 4A to 4C are diagrams illustrating an operation for displaying content on the curved region of the display, according to various embodiments of the present disclosure.

According to an embodiment, if a swipe operation that starts on the dummy region 20 toward the content region 10 is inputted while a dummy image is displayed on the dummy region 20, the controller 170 may display different pieces of content on the curved region 113 (that is, the content region 10 and the dummy region 20) based on the intensity of the pressure that is caused by the user manipulation and sensed by a sensor. For example, the controller 170 may display first content on the curved region 113 if the swipe operation toward the content region 10 is inputted after the user manipulation that applies pressure, of which the intensity is greater than or equal to a specific intensity, on the dummy region 20 is inputted while the dummy image is displayed on the dummy region 20. The first content, for example, may be a user interface (or a panel bar) (e.g., including a notification message, an application icon, and the like) that the electronic device 100 provides. As another example, when the swipe operation toward the content region 10 is inputted after the user manipulation that applies pressure, of which the intensity is less than the specific intensity, on the dummy region 20 is inputted while the dummy image is displayed on the dummy region 20, the controller 170 may display second content on the curved region 113 or may disregard the user manipulation. The second content may be a user interface (or a panel bar) that a running application provides. The specific intensity may correspond, for example, to the intensity of the pressure applied to the electronic device 100 based on the user manipulation that the user intentionally inputs.

Referring to FIG. 4A, the content (e.g., a picture) may be displayed on the flat region 111 and the content region 10 of the display 110, and the dummy image may be displayed on the dummy region 20. A user manipulation 31 that applies the pressure of which the intensity is greater than or equal to the specific intensity may be inputted on the dummy region 20 with the dummy image displayed on the dummy region 20. Referring to FIG. 4B, a swipe operation toward the content region 10 may be inputted after the user manipulation 31 that applies the pressure, of which the intensity is greater than or equal to the specific intensity, on the dummy region 20 is inputted. That is, the user manipulation 31 inputted on the dummy region 20 may be inputted into the flat region 111 through the content region 10. Accordingly, referring to FIG. 4C, the user interface (or the panel bar) that the electronic device 100 provides may be displayed on the curved region 113.

Figure 5:
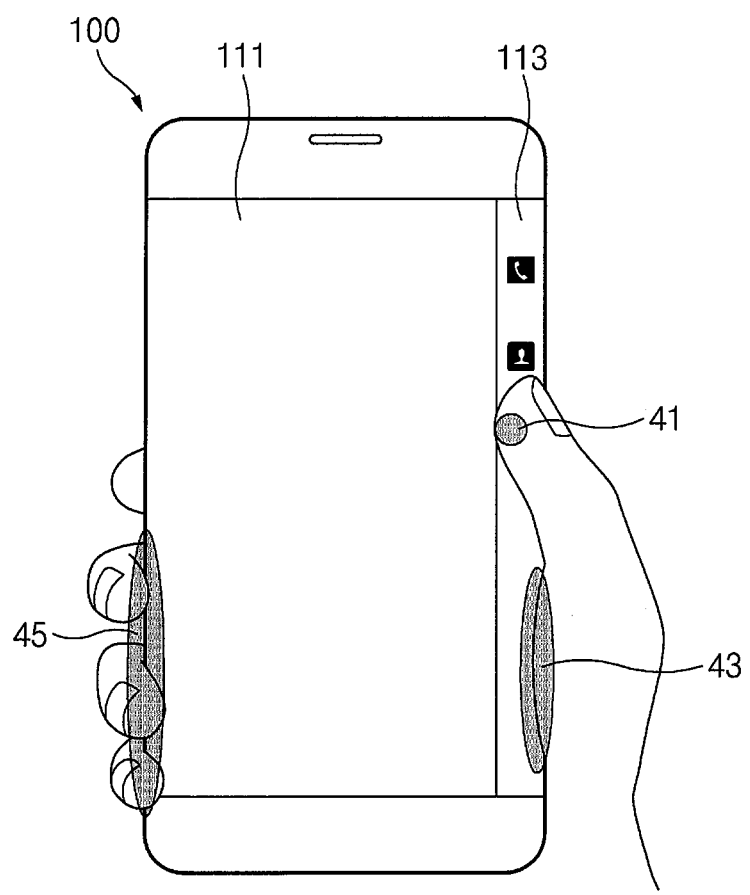
FIG. 5 is a diagram illustrating an example in which a user manipulation is inputted on the curved region.

FIG. 5 is a diagram illustrating an example in which a user manipulation is inputted on the curved region.

According to an embodiment, if a user manipulation that applies pressure of which the intensity is greater than or equal to the specific intensity is inputted on the curved region 113, the controller 170 may perform an operation corresponding to the user manipulation. In contrast, if the user manipulation that applies pressure of which the intensity is less than the specific intensity is inputted on the curved region 113, the controller 170 may disregard the user manipulation. According to an embodiment, in the case where a plurality of user manipulations are inputted at the same time, the controller 170 may determine whether the pressure applied by each of the user manipulations has the specific intensity.

Referring to FIG. 5, a user may input the user manipulation on the curved region 113 in a state where the user grips the electronic device 100. For example, the user may select an icon displayed on the curved region 113 using a thumb. In the case where the user inputs the user manipulation for selecting the icon displayed on the curved region 113, the user manipulation may be sensed at a location 41 on which the icon is displayed. Furthermore, the user manipulation that is caused by a user grip may be sensed at partial regions 43 and 45 of the curved region 113, respectively. The pressure of which the intensity is greater than or equal to the specific intensity and which is generated based on the user's intentional touch manipulation may be sensed at the location 41 on which the icon is displayed, and the pressure of which the intensity is less than the specific intensity may be sensed at the regions 43 and 45 where the user manipulations caused by the user grip are sensed. Accordingly, the controller 170 may execute an application corresponding to the icon that the user selects and may disregard the user manipulation caused by the user grip.

According to an embodiment, the controller 170 may determine whether the user grips the electronic device 100, based on the location of the user manipulation inputted on the curved region 113 of the display 110 and a result of sensing the pressure caused by the user manipulation inputted on the curved region 113 of the display 110. The controller 170 may determine whether the user grips the electronic device 100, based on at least one of an area of the user manipulation inputted on the curved region 113, a shape of the user manipulation, the location of the sensed pressure, or an intensity of the sensed pressure. For example, if a size of the area of the user manipulation inputted on the curved region 113 is greater than or equal to a specific size, and the pressure of which the intensity is greater than or equal to the specific intensity is sensed at the left pressure sensor (that is, the pressure sensor disposed under the left curved region) and the right pressure sensor (that is, the pressure sensor disposed under the right curved region), the controller 170 may determine that the user grips the electronic device 100. As another example, if the user manipulation of a shape specified for the curved region 113 is inputted on the curved region 113, and the pressure of which the intensity is greater than or equal to the specific intensity is sensed at the left and right pressure sensors, the control module 170 may determine that the user grips the electronic device 100.

According to an embodiment, if the electronic device 100 is determined as being not gripped by the user, the controller 170 may perform the operation corresponding to the user manipulation regardless of the pressure applied by the user manipulation. For example, in the case where the user inputs a touch manipulation while the electronic device 100 is disposed on a table, the controller 170 may perform the operation corresponding to the user manipulation regardless of the pressure applied by the user manipulation.

Figure 6A:
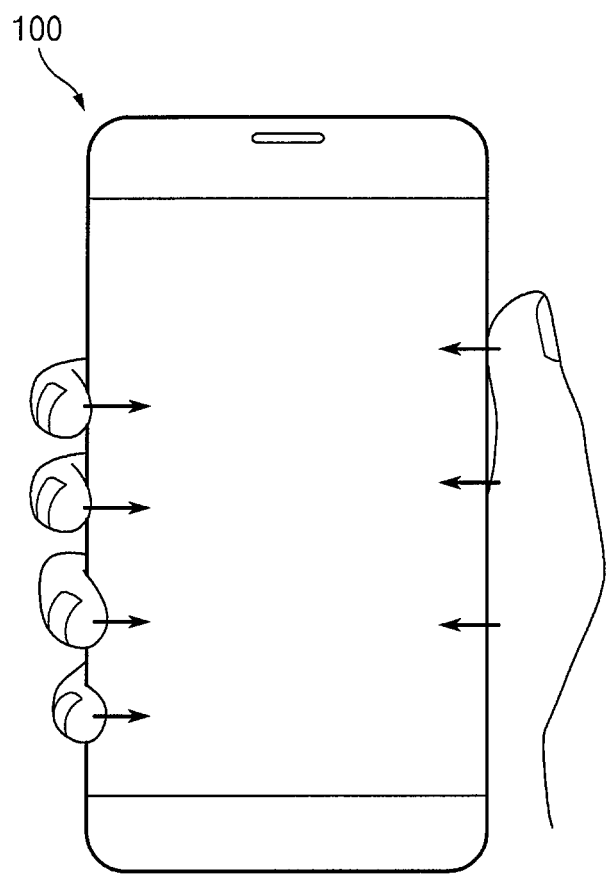
FIGS. 6A and 6B are diagrams illustrating an operation for displaying content on the curved region of the display, according to various embodiments of the present disclosure.
Figure 6B:
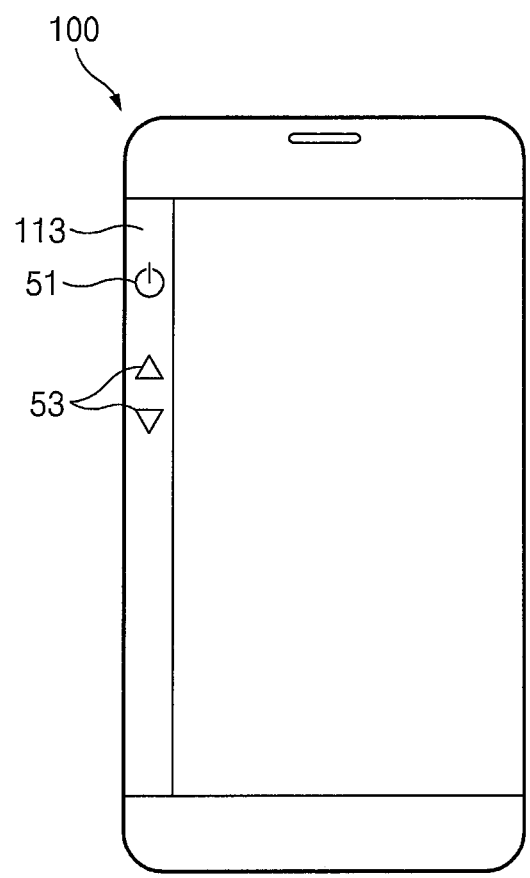

FIGS. 6A and 6B are diagrams illustrating an operation for displaying content on the curved region of the display, according to various embodiments of the present disclosure.

According to an embodiment, if it is determined that a user grips the electronic device 100 with the pressure, of which the intensity is greater than or equal to the specific intensity, for a specific time, the controller 170 may display a power icon 51 or volume icon 53 on the curved region 113. The specific intensity, for example, may be set higher than intensity of the pressure that is generally applied when the user grips the electronic device 100.

Referring to FIG. 6A, the user may apply a force to the electronic device 100 in a state where the user grips the electronic device 100. According to an embodiment, if the pressure of which the intensity is greater than or equal to the specific intensity is sensed in a state where the user grips the electronic device 100, the controller 170 may generate the haptic effect using the motor 160. If the gripped state is maintained with the pressure, of which the intensity is greater than or equal to the specific intensity, for a specific time after the haptic effect occurs, as illustrated in FIG. 6B, the power icon 51 or the volume icon 53 may be displayed on the curved region 113. According to an embodiment, the power icon 51 or the volume icon 53 may be displayed on a location (e.g., a top left or a top right) which is able to be selected without changing the grip in a state where the user grips the electronic device 100. According to an embodiment, the user may set the location on which the power icon 51 or the volume icon 53 is displayed. According to an embodiment, if the user manipulation about the power icon 51 or the volume icon 53 is inputted, the controller 170 may perform a specific function. For example, if a touch manipulation, such as a touch, a touch-drag, a swipe, or the like, about the power icon 51 is inputted while the power icon 51 is displayed on the curved region 113, the controller 170 may turn off the power of the display 110 or may turn off the power of the electronic device 100. Furthermore, in the case where the above-described operation is performed while the display 110 is in the power-off state, the controller 170 may turn on the power of the display 110. For another example, when a touch manipulation, such as a touch, a touch-drag, a swipe, or the like, about the volume icon 53 is inputted with the volume icon 53 displayed on the curved region 113, the controller 170 may increase or decrease a volume of the sound outputted from the electronic device 100. Accordingly, a power button or a volume control button removed on the side surface of the electronic device 100 may be replaced with the icons displayed on a curved display that is applied on the side of the electronic device 100.

Figure 7:
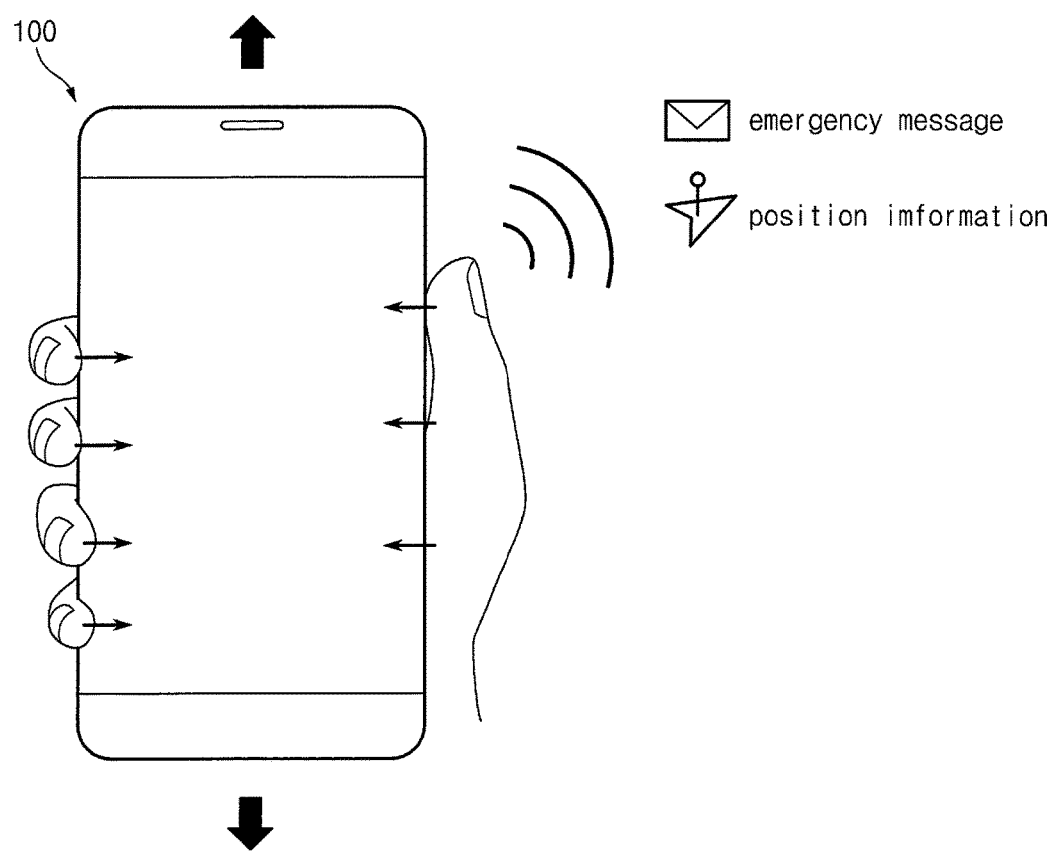
FIG. 7 illustrates an example in which an emergency message is sent to the external device, according to various embodiments of the present disclosure.

FIG. 7 illustrates an example in which an emergency message is sent to an external device (not shown), according to various embodiments of the present disclosure.

According to an embodiment, if a specific movement is sensed for a specific time in a state where a user grips the electronic device 100 with the pressure of which the intensity is greater than or equal to the specific intensity, the controller 170 may send the emergency message to the external device of a selected contact through the communication interface 130. According to an embodiment, the current position of the electronic device 100 may be sent with the emergency message.

Referring to FIG. 7, the user may apply a force to the electronic device 100 by gripping the electronic device 100. According to an embodiment, if the user grips the electronic device 100 with the pressure, of which the intensity is greater than or equal to the specific intensity, the controller 170 may generate the haptic effect using the motor 160. If the user repeatedly shakes the electronic device 100 up and down for a specific time after the haptic effect occurs, the emergency message and the current position of the electronic device 100 may be sent to the external device of the selected contact.

Figure 8:
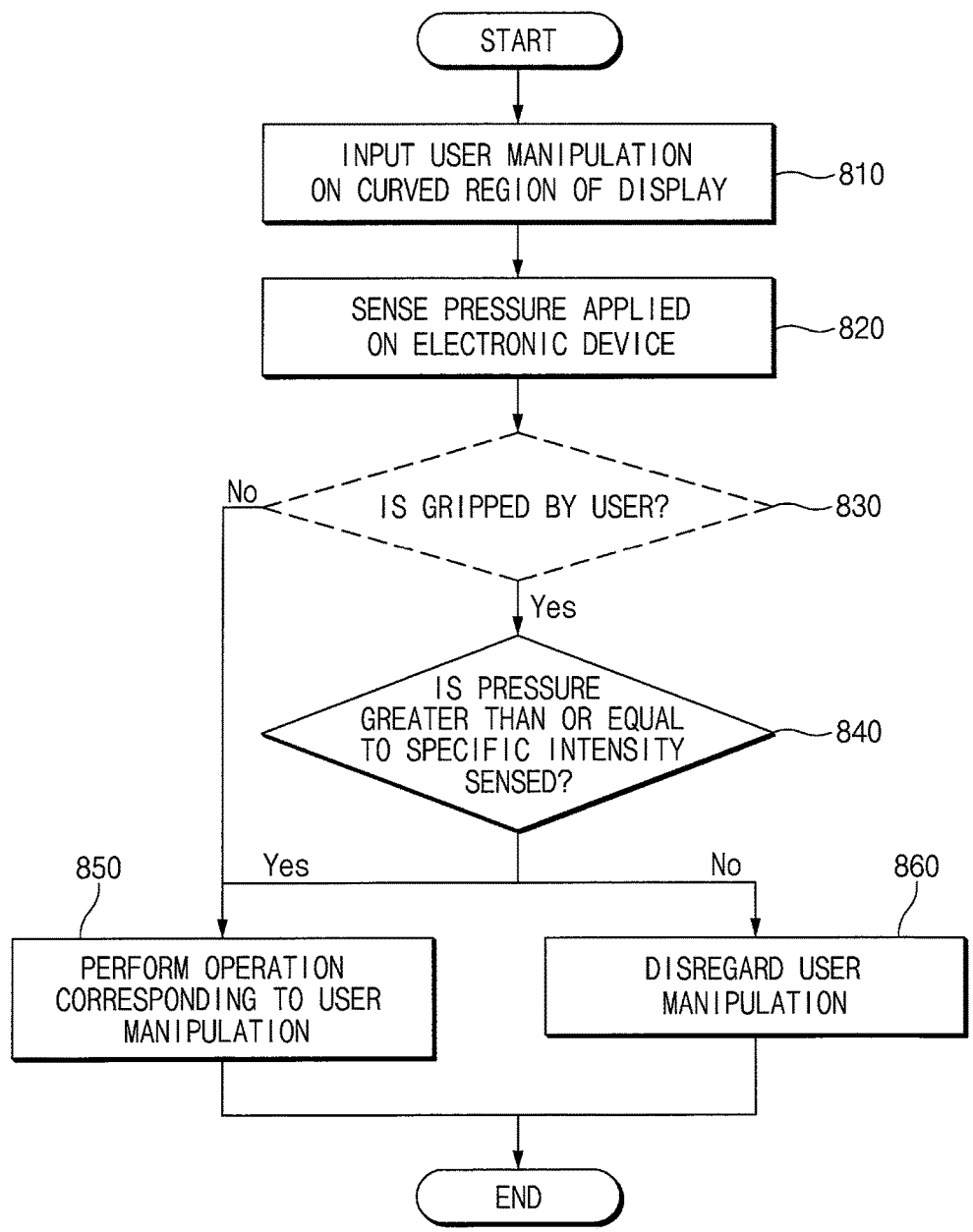
FIG. 8 is a flow chart illustrating a method for controlling the electronic device, according to various embodiments of the present disclosure.

FIG. 8 is a flow chart illustrating a method for controlling the electronic device, according to various embodiments of the present disclosure.

The flow chart illustrated in FIG. 8 may include operations that are processed by the electronic device 100 illustrated in FIG. 1. Even though omitted below, information about the electronic device 100 described with reference to FIGS. 1 to 7 may be applied to the flowchart illustrated in FIG. 8.

Referring to FIG. 8, in operation 810, the electronic device 100 may receive a user manipulation on the curved region 113 of the display 110 that includes the flat region 111 and the curved region 113. According to an embodiment, the curved region 113 may include the content region 10 on which content is displayed and the dummy region 20 on which a dummy image or content is displayed. The user manipulation inputted at the curved region 113 of the display 110 may include, for example, the user manipulation inputted at the flat region 111 and the curve region 113 at the same time as well as the user manipulation inputted only at the curved region 113.

According to an embodiment, in operation 820, the electronic device 100 may sense a pressure applied to the electronic device 100. For example, the electronic device 100 may sense a pressure generated due to the user grip and/or a pressure generated by an intentional touch manipulation of the user.

According to an embodiment, in operation 830, the electronic device 100 may determine whether the user grips the electronic device 100. According to an embodiment, the electronic device 100 may determine whether the user grips the electronic device 100 based on the location of the user manipulation inputted on the curved region 113 of the display 110 and a result of sensing the pressure caused by the user manipulation. That is, the electronic device 100 may determine whether the user grips the electronic device 100 based on at least one of an area of the user manipulation inputted on the curved region 113, a shape of the user manipulation, the location of the sensed pressure, or an intensity of the pressure.

According to an embodiment, if the electronic device 100 is determined as being not gripped by the user, in operation 850, the electronic device 100 may perform an operation corresponding to the user manipulation. For example, if the electronic device 100 is determined as being not gripped by the user, the electronic device 100 may perform the operation corresponding to the user manipulation regardless of the pressure caused by the user manipulation.

According to an embodiment, if the electronic device 100 is determined as being gripped by the user, in operation 840, the electronic device 100 may determine whether the pressure of which the intensity is greater than or equal to the specific intensity is caused by the user manipulation. In the case where a plurality of user manipulations are inputted at the same time, the electronic device 100 may determine whether the pressure applied by each of the user manipulations has the specific intensity.

According to an embodiment, if the inputted user manipulation applies the pressure, of which the intensity is greater than or equal to the specific intensity, on the curved region 113, in operation 850, the electronic device 100 may perform the operation corresponding to the user manipulation. According to an embodiment, if the inputted user manipulation applies the pressure, of which the intensity is less than the specific intensity, on the curved region 113, in operation 860, the electronic device 100 may disregard the user manipulation.

According to an embodiment, operation 830 of operations illustrated in FIG. 8 may be omitted. That is, the electronic device 100 may perform the operation corresponding to the user manipulation based on a result of sensing the pressure caused by the user manipulation regardless of whether the user grips the electronic device 100 or not. For example, if the inputted user manipulation applies the pressure of which the intensity is greater than or equal to the specific intensity on the curved region 113, the electronic device 100 may perform the operation corresponding to the user manipulation regardless of whether the user grips the electronic device 100 or not. In contrast, if the inputted user manipulation, which applies the pressure of which the intensity is less than the specific intensity on the curved region 113, the electronic device 100 may disregard the user manipulation.

According to an embodiment, if a swipe operation that starts on the dummy region 20 toward the content region 10 is inputted while the dummy image is displayed on the dummy region 20, the electronic device 100 may display different content on the curved region 113 based on the intensity of the pressure that is caused by the user manipulation and sensed by a sensor. For example, if the swipe operation toward the content region 10 is inputted after the user manipulation that applies the pressure of which the intensity is greater than or equal to the specific intensity is inputted on the dummy region 20 while the dummy image is displayed on the dummy region 20, the electronic device 100 may display first content on the curved region 113. If the swipe operation toward the content region 10 is inputted after the user manipulation that applies the pressure of which the intensity is less than the specific intensity is inputted on the dummy region 20 while the dummy image is displayed on the dummy region 20, the electronic device 100 may display second content on the curved region 113 or may disregard the user manipulation.

According to an embodiment, the electronic device 100 may disregard the user manipulation inputted on the dummy region 20 while the dummy image is displayed on the dummy region 20.

According to an embodiment, if it is determined that the user grips the electronic device 100 with the pressure, of which the intensity is greater than or equal to the specific intensity, for a specific time, the electronic device 100 may display the power icon 51 or the volume icon 53 on the curved region 113.

According to an embodiment, if a specific movement is sensed for a specific time in a state where the user grips the electronic device 100 with the pressure, of which the intensity is greater than or equal to the specific intensity, the electronic device 100 may send the emergency message to the external device of the selected contact. According to an embodiment, the current position of the electronic device 100 may be sent with the emergency message.

Figure 9:
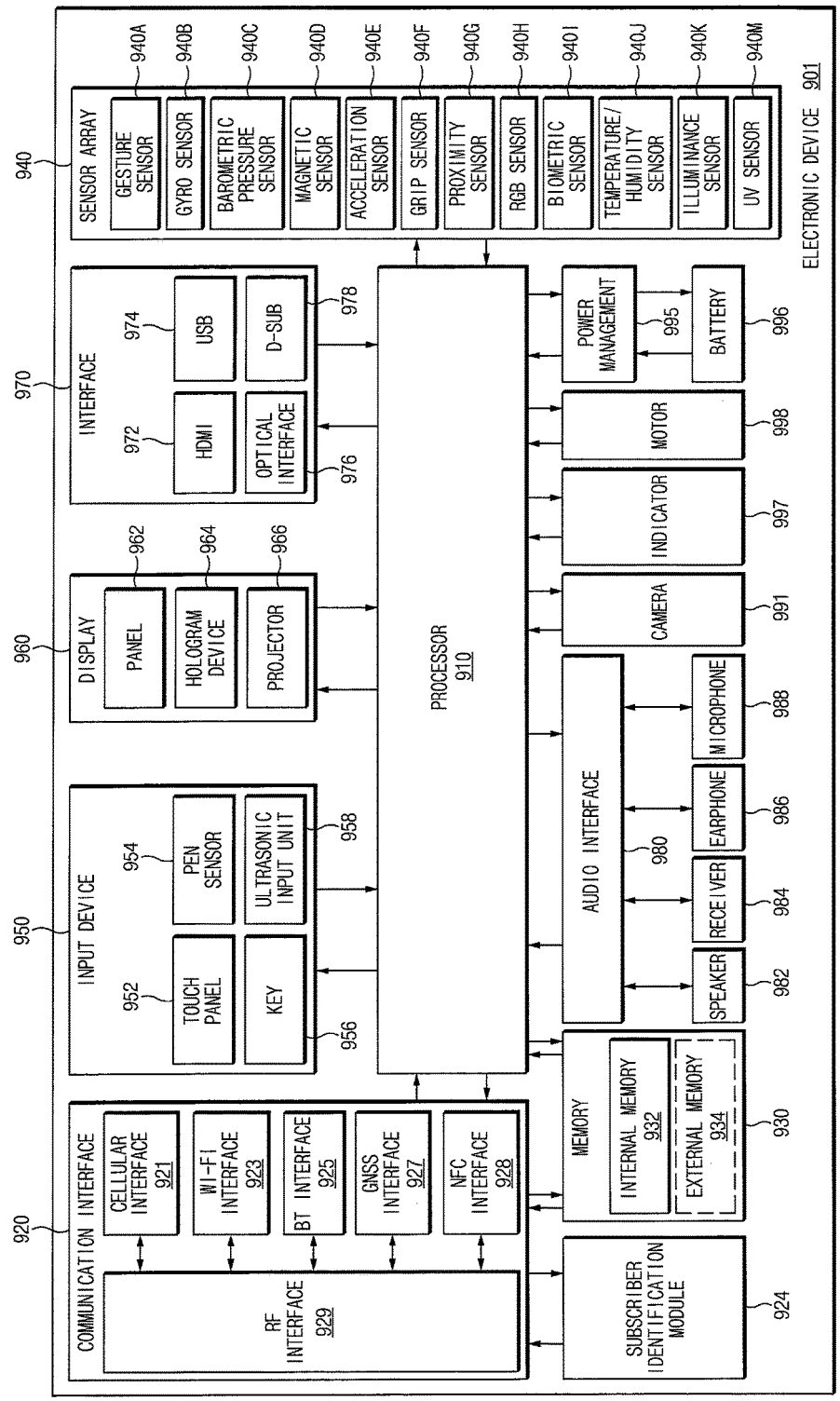
FIG. 9 is a block diagram illustrating an electronic device according to various embodiments of the present disclosure.

FIG. 9 is a block diagram illustrating an electronic device according to various embodiments of the present disclosure.

The electronic device 901 may include, for example, all or a part of the electronic device 100 illustrated in FIG. 1. The electronic device 901 may include one or more processors (e.g., an application processor) 910, a communication interface 920, a subscriber identification module 924, a memory 930, a sensor array 940, an input device 950, a display 960, an interface 970, an audio interface 980, a camera 991, a power management 995, a battery 996, an indicator 997, and a motor 998.

The processor 910 may drive an operating system (OS) or an application to control a plurality of hardware or software elements connected to the processor 910 and may process and compute a variety of data. The processor 910 may be implemented with a System on Chip (SoC), for example. According to an embodiment, the processor 910 may further include a graphic processing unit (GPU) and/or an image signal processor. The processor 910 may include at least a part (e.g., a cellular module 921) of elements illustrated in FIG. 9. The processor 910 may load and process an instruction or data, which is received from at least one of other elements (e.g., a nonvolatile memory), and may store a variety of data at a nonvolatile memory.

The communication interface 920 may include a cellular interface 921, a Wi-Fi interface 923, a Bluetooth (BT) interface 925, a GNSS interface 927 (e.g., a GPS interface, a Glonass interface, Beidou interface, or a Galileo interface), a near field communication (NFC) interface 928, and a radio frequency (RF) interface 929.

The cellular interface 921 may provide voice communication, video communication, a message service, an Internet service or the like through a communication network. According to an embodiment, the cellular interface 921 may perform discrimination and authentication of the electronic device 901 within a communication network using the subscriber identification module 924 (e.g., a SIM card), for example. According to an embodiment, the cellular interface 921 may perform at least a portion of functions that the processor 910 provides. According to an embodiment, the cellular interface 921 may include a communication processor (CP).

According to an embodiment, at least a portion (e.g., two or more components) of the cellular interface 921, the Wi-Fi interface 923, the BT interface 925, the GNSS interface 927, and the NFC interface 928 may be included within one Integrated Circuit (IC) or an IC package.

The RF interface 929 may transmit and receive a communication signal (e.g., an RF signal). The RF interface 929 may include a transceiver, a power amplifier module (PAM), a frequency filter, a low noise amplifier (LNA), an antenna, or the like. According to another embodiment, at least one of the cellular interface 921, the Wi-Fi interface 923, the BT interface 925, the GNSS interface 927, or the NFC interface 928 may transmit and receive an RF signal through a separate RF module.

The subscriber identification module 924 may include, for example, a subscriber identification module and may include unique identification information (e.g., integrated circuit card identifier (ICCID)) or subscriber information (e.g., integrated mobile subscriber identity (IMSI)).

The memory 930 may include an internal memory 932 or an external memory 934. For example, the internal memory 932 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 934 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 934 may be functionally and/or physically connected to the electronic device 901 through various interfaces.

The sensor array 940 may measure, for example, a physical quantity or may detect an operation state of the electronic device 901. The sensor array 940 may convert the measured or detected information to an electric signal. The sensor array 940 may include at least one of a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (e.g., red, green, blue (RGB) sensor), a biometric sensor 940I, a temperature/humidity sensor 940J, an illuminance sensor 940K, or an UV sensor 940M. Even though not illustrated, additionally or alternatively, the sensor array 940 may further include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor array 940 may further include a control circuit for controlling at least one or more sensors included therein. According to an embodiment, the electronic device 901 may further include a processor which is a part of the processor 910 or independent of the processor 910 and is configured to control the sensor array 940. The processor may control the sensor array 940 while the processor 910 remains at a sleep state.

The input device 950 may include, for example, a touch panel 952, a (digital) pen sensor 954, a key 956, or an ultrasonic input unit 958. The touch panel 952 may use at least one of capacitive, resistive, infrared or ultrasonic detecting methods. Also, the touch panel 952 may further include a control circuit. The touch panel 952 may further include a tactile layer to provide a tactile reaction to a user.

The (digital) pen sensor 954 may be, for example, a part of a touch panel or may include an additional sheet for recognition. The key 956 may include, for example, a physical button, an optical key, a keypad, and the like. The ultrasonic input device 958 may detect (or sense) an ultrasonic signal, which is generated from an input device, through a microphone (e.g., a microphone 988) and may check data corresponding to the detected ultrasonic signal.

The display 960 (e.g., the display 110) may include a panel 962, a hologram device 964, and/or a projector 966. The panel 962 may be implemented to be flexible, transparent or wearable, for example. The panel 962 and the touch panel 952 may be integrated into a single module. The hologram device 964 may display a stereoscopic image in a space using a light interference phenomenon. The projector 966 may project light onto a screen so as to display an image. The screen may be arranged in the inside or the outside of the electronic device 901. According to an embodiment, the display 960 may further include a control circuit for controlling the panel 962, the hologram device 964, or the projector 966.

The interface 970 may include, for example, an HDMI (high-definition multimedia interface) 972, a USB (universal serial bus) 974, an optical interface 976, or a D-sub (D-subminiature) 978. Additionally or alternatively, the interface 970 may include, for example, a mobile high definition link (MHL) interface, a SD card/multi-media card (MMC) interface, or an infrared data association (IrDA) standard interface.

The audio interface 980 may convert a sound and an electric signal in dual directions. The audio interface 980 may process, for example, sound information that is input or output through a speaker 982, a receiver 984, an earphone 986, or the microphone 988.

The camera 991 for shooting a still image or a video may include, for example, at least one image sensor (e.g., a front sensor or a rear sensor), a lens, an image signal processor (ISP), or a flash (e.g., an LED or a xenon lamp).

The power management 995 may manage, for example, power of the electronic device 901. According to an embodiment, a power management integrated circuit (PMIC), a charger IC, or a battery or fuel gauge may be included in the power management 995. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 996 and a voltage, current or temperature thereof while the battery is charged. The battery 996 may include, for example, a rechargeable battery or a solar battery.

The indicator 997 may display a specific state of the electronic device 901 or a portion thereof (e.g., a processor 910), such as a booting state, a message state, a charging state, and the like. The motor 998 may convert an electrical signal into a mechanical vibration and may generate the following effects: vibration, haptic, and the like. Even though not illustrated, a processing device (e.g., a GPU) for supporting a mobile TV may be included in the electronic device 901. The processing device for supporting a mobile TV may process media data according to the standards of DMB, digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. According to various embodiments, the electronic device may not include some elements or may further include other additional element(s) Furthermore, some of the elements of the electronic device according to various embodiments may be combined with each other so as to form one entity, so that the functions of the elements may be performed in the same manner as before the combination.

The term "interface" used herein may represent, for example, a unit including one or more combinations of hardware, software and firmware. The term "interface" may be interchangeably used with the terms "unit", "logic", "logical block", "component" and "circuit". The "interface" may be a minimum unit of an integrated component or may be a part thereof. The "interface" may be a minimum unit for performing one or more functions or a part thereof. The "interface" may be implemented mechanically or electronically. For example, the "interface" may include at least one of an application-specific IC (ASIC) chip, a field-programmable gate array (FPGA), and a programmable-logic device for performing some operations, which are known or will be developed.

At least a portion of an apparatus (e.g., interfaces or functions thereof) or a method (e.g., operations) according to various embodiments may be, for example, implemented by instructions stored in a computer-readable storage media in the form of a program module. If the instructions are executed by a processor (e.g., the control module 170), the one or more processors may perform functions corresponding to the instructions.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments, and vice versa.

Interfaces or program modules according to various embodiments may include at least one or more of the above-mentioned components, some of the above-mentioned components may be omitted, or other additional components may be further included therein. Operations executed by modules, program modules, or other elements may be executed by a successive method, a parallel method, a repeated method, or a heuristic method. Also, a portion of operations may be executed in different sequences, omitted, or other operations may be added.

According to various embodiments of the present disclosure, it may be possible to protect against the unintentional touch manipulation performed by the user based on the pressure that is applied by the user manipulation and to provide a user-friendly usage environment that replaces the hardware buttons, which may be removed or of which the locations may be changed, to the user.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
    a display including a flat region and at least one curved region, wherein the at least one curved region comprises a content region on which content is displayed and a dummy region on which a dummy image or content is displayed;
    an input device configured to receive a user manipulation;
    at least one pressure sensor configured to sense a pressure caused by the user manipulation; and
    a processor configured to:
        perform an operation corresponding to the user manipulation based on the sensed pressure caused by the user manipulation input on the at least one curved region,
        display first content on the at least one curved region if a swipe operation toward the content region is input after the pressure caused by the user manipulation, the pressure having an intensity greater than or equal to a specific intensity, on the dummy region is input while the dummy image is displayed on the dummy region, and
        display second content on the at least one curved region if the swipe operation toward the content region is input after the pressure caused by the user manipulation, the pressure having an intensity less than the specific intensity, on the dummy region is input while the dummy image is displayed on the dummy region.

2. The electronic device of claim 1, wherein the processor is configured to perform the operation corresponding to the user manipulation if the pressure caused by the user manipulation, the pressure having an intensity greater than or equal to a specific intensity, is input on the at least one curved region and to disregard the user manipulation if the pressure caused by the user manipulation, the pressure having an intensity less than the specific intensity, is input on the at least one curved region.

3. The electronic device of claim 1, wherein the processor is configured to determine whether a user grips the electronic device, based on a location of the user manipulation input on the at least one curved region and the sensed pressure caused by the user manipulation.

4. The electronic device of claim 3, wherein the processor is configured to perform the operation corresponding to the user manipulation if the pressure caused by the user manipulation, the pressure having an intensity greater than or equal to a specific intensity, is input on the at least one curved region and the processor determines that the user grips the electronic device and to disregard the user manipulation if the pressure caused by the user manipulation, the pressure having an intensity less than the specific intensity, is input on the curved region and the processor determines that the user grips the electronic device.

5. The electronic device of claim 3, wherein the processor is configured to display a power icon or a volume control icon on the at least one curved region if it is determined that the user grips the electronic device with a grip pressure, the grip pressure having an intensity greater than or equal to a specific intensity, for a specific time.

6. The electronic device of claim 3, further comprising:
a motion detection sensor configured to sense a movement of the electronic device, and
a communication interface configured to communicate with an external device,
wherein the processor is configured to send an emergency message to the external device through the communication interface if a specific movement is sensed for a specific time while the user grips the electronic device with a grip pressure, the grip pressure having an intensity greater than or equal to a specific intensity.

7. The electronic device of claim 1, the processor is configured to disregard the user manipulation input on the dummy region while the dummy image is displayed on the dummy region.

8. The electronic device of claim 1, wherein the at least one pressure sensor is disposed under the at least one curved region.

9. A method for controlling an electronic device, the method comprising:
receiving a user manipulation on a curved region of a display that comprises a flat region and at least one curved regions;
sensing a pressure caused by the user manipulation input on the curved region; and
performing an operation corresponding to the user manipulation based on the sensed pressure caused by the user manipulation,
wherein the curved region comprises a content region on which content is displayed and a dummy region on which a dummy image or content is displayed, and
wherein performing the operation comprises:
displaying first content on the curved region if a swipe operation toward the content region is input after the pressure caused by the user manipulation, the pressure having an intensity greater than or equal to a specific intensity, on the dummy region; and
displaying second content on the curved region if the swipe operation toward the content region is input after the pressure caused by the user manipulation, the pressure having an intensity less than the specific intensity, on the dummy region is input while the dummy image is displayed on the dummy region.

10. The method of claim 9, wherein the performing of the operation comprises:
performing the operation corresponding to the user manipulation if the pressure caused by the user manipulation, the pressure having an intensity greater than or equal to a specific intensity, on the curved region is input; and
disregarding the user manipulation if the pressure caused by the user manipulation, the pressure having an intensity less than the specific intensity, on the curved region is input.

11. The method of claim 9, further comprising:
determining whether a user grips the electronic device based on a location of the user manipulation input on the curved region and the sensed pressure caused by the user manipulation.

12. The method of claim 11, wherein the performing of the operation comprises:
performing the operation corresponding to the user manipulation if the pressure caused by the user manipulation, the pressure having an intensity greater than or equal to a specific intensity, is input on the curved region while the user grips the electronic device; and
disregarding the user manipulation if the pressure caused by the user manipulation, the pressure having an intensity less than the specific intensity, is input on the curved region while the user grips the electronic device.

13. The method of claim 11, wherein the performing of the operation comprises:
displaying a power icon or a volume control icon on the curved region if it is determined that the user grips the electronic device with a grip pressure, the grip pressure having an intensity greater than or equal to a specific intensity, for a specific time.

14. The method of claim 11, further comprising:
sensing a movement of the electronic device, and
wherein performing the operation comprises:
sending, while the user grips the electronic device with a grip pressure, an emergency message to an external device if a specific movement is sensed for a specific time on the electronic device, the grip pressure having an intensity greater than or equal to a specific intensity.

15. The method of claim 9, further comprising:
disregarding the user manipulation input on the dummy region while the dummy image is displayed on the dummy region.

16. A non-transitory computer-readable recording medium having a program recorded thereon, the program, when executed, is configured to cause an electronic device to perform a method, the method comprising:
receiving a user manipulation input on a curved region of a display that comprises a flat region and the curved region;
sensing a pressure caused by the user manipulation input on the curved region; and
performing an operation corresponding to the user manipulation based on the sensed pressure caused by the user manipulation,
wherein the curved region comprises a content region on which content is displayed and a dummy region on which a dummy image or content is displayed, and
wherein performing the operation comprises:
displaying first content on the curved region if a swipe operation toward the content region is input after the pressure caused by the user manipulation, the pressure having an intensity greater than or equal to a specific intensity, on the dummy region; and
displaying second content on the curved region if the swipe operation toward the content region is input after the pressure caused by the user manipulation, the pressure having an intensity less than the specific intensity, on the dummy region is input while the dummy image is displayed on the dummy region.

* * * * *